D. BRUHN.
VEHICLE JACK.
APPLICATION FILED JULY 10, 1919.

1,340,150.

Patented May 18, 1920.
2 SHEETS—SHEET 1.

D. BRUHN.
VEHICLE JACK.
APPLICATION FILED JULY 10, 1919.

1,340,150.

Patented May 18, 1920.
2 SHEETS—SHEET 2.

Inventor
Daniel Bruhn
By Philip A. H. Serell
his Attorney

UNITED STATES PATENT OFFICE.

DANIEL BRUHN, OF HAMMOND, INDIANA.

VEHICLE-JACK.

1,340,150.  Specification of Letters Patent.  Patented May 18, 1920.

Application filed July 10, 1919. Serial No. 309,977.

*To all whom it may concern:*

Be it known that I, DANIEL BRUHN, a citizen of the United States, residing at Hammond, in the county of Lake and State of Indiana, have invented certain new and useful Improvements in Vehicle-Jacks, of which the following is a specification, reference being had therein to the accompanying drawing.

The invention relates to jacks and particularly to wheel jacks of the type used for jacking up automobiles and has for its object to provide a jack of this type, wherein a wheel base is provided and rockably but vertically slidable in bearings carried by said wheel base is a cross bar having eccentrics or cams adapted to engage said base, whereby said cross bar will be moved vertically in its bearings as the operating lever is forced downwardly for raising the axle of the automobile.

A further object of the invention is to form the rockable and vertically movable cross bar integral with sleeves, said sleeves having vertically adjustable axle engaging arms.

A further object is to so construct the parts so that as the operating lever is forced downwardly, the axle of the vehicle will be raised and the wheeled base moved under the axle until the cam assumes such a position that the center of the axle, the bearing point of the rockable bar and the cam engaging point are substantially in alinement with each other, also to provide means whereby said operating lever may be secured in down position.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of what is claimed.

In the drawings:—

Fig. 5 is a perspective view of one end of the rockable bar, its integral cam and sleeve.

Figure 1:
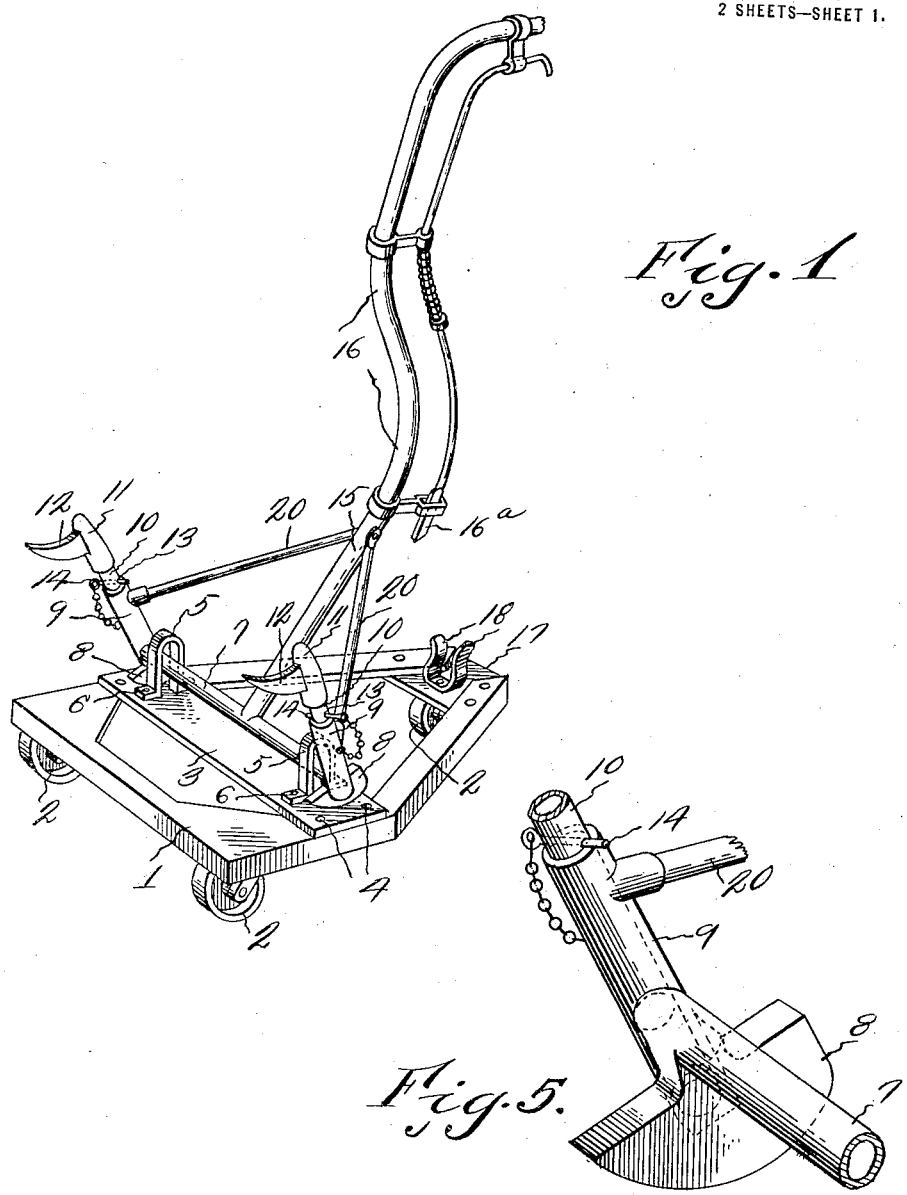
Figure 1 is a perspective view of the jack, showing the same in position to be placed under and into engagement with an automobile axle.

Referring to the drawings the numeral 1 designates a base member, which may be formed from angle iron or any other suitable material, said base member being provided with wheels 2 of a caster type, whereby said base may be easily moved from place to place without the necessity of lifting the jack as a whole. The upper face of the base is provided with a transversely disposed plate 3, which plate is secured to said base by rivets or the like 4.

A U-shaped bracket 5 is secured by rivets 6 to each end of the plate 3, said U-shaped brackets 5 forming bearings for a transversely disposed rockable bar 7 in bearings of which said U-shaped brackets said bar 7 is adapted to rock and at the same time it is rocking to be moved vertically within said U-shaped brackets. Depending downwardly from the ends of the bar 7 are integral cams 8, which are adapted to engage the plate 3 as the bar is rocked, thereby moving said bar vertically. Also integrally formed with the ends of the rockable bar 7 and cams 8 are sleeves 9, said sleeves having telescopically engaging them uprights 10 which uprights terminate in heads 11 having forwardly extending curved arms 12. Arms 12 are adapted to engage under an axle of a vehicle as clearly shown in Fig. 2. The preferable positioning being with one arm on each side of the differential casing, however the jack may be used on the front axle if so desired. The uprights are preferably tubular and are provided with a series of apertures 13, through which apertures, pins 14 are passed so that the uprights 10 may be adjusted for different makes of vehicles, wherein the height of the axles from the ground vary.

Rockable bar 7 is provided with a handle member 15, said handle member being preferably provided with a compound curve 16 for facilitating the leverage by eliminating the necessity of the operator leaning over to an extreme position, said lever being provided with a spring actuated detent 16, which detent is adapted to engage under the edge 17 at the apex end of the base 1. Base 1 at its apex end is also provided with spring ears 18, between which the hand 15 engages and the detent 16 is guided to position under the edge 17.

Figure 2:
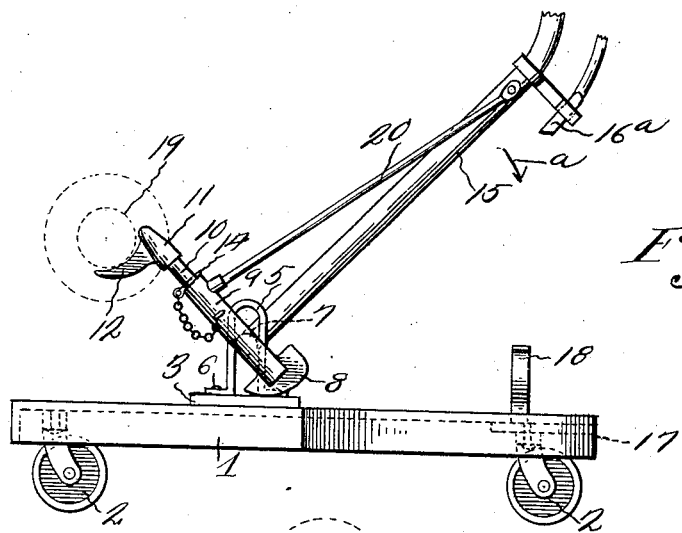
Fig. 2 is a side elevation showing the jack in position, for raising the axle of an automobile.
Figure 3:
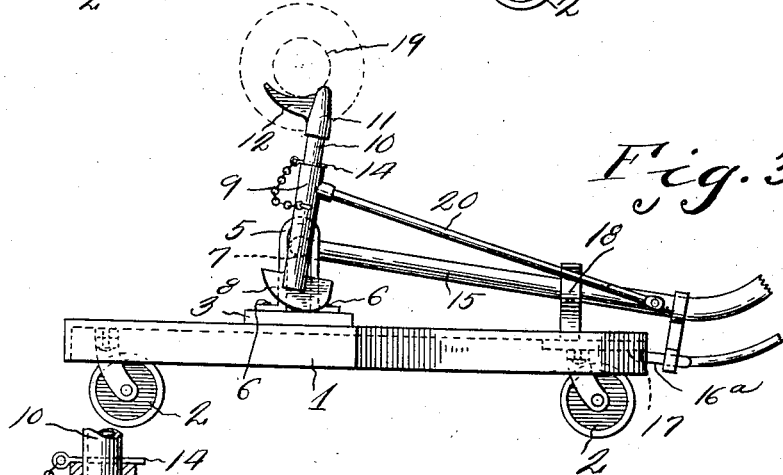
Fig. 3 is a side elevation showing the axle in raised position.
Figure 4:
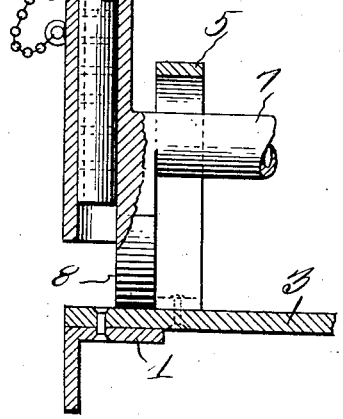
Fig. 4 is a detail sectional view through one of the bearings of the rockable bar and the adjustable axle engaging standard and its sleeve.

When it is desired to jack up a vehicle, preferably an automobile, the jack is placed in the position shown in Fig. 2 and the arms 12 in engagement with the axle 19, then the handle is moved downwardly in the direction of the arrow $a$ of Fig. 2, which downward movement will cause the cams 8 to cam against the face of the plate 3, said camming action causing arms 12 to raise the vehicle and at the same time causing the transverse bar 7 to move vertically in the bearings of the U-shaped brackets, thereby raising the vehicle and at the same time moving the base 1 forwardly until the parts assume the position shown in Fig. 3.

From the above it will be seen that a jack is provided which is positive in its action and one wherein the parts are reduced to a minimum.

Sleeves 9 are braced by rods 20 which extend between said sleeves and the handle member 15.

The invention having been set forth what is claimed as new and useful is:—

1. A vehicle jack comprising a wheeled base, said base having rockably mounted in vertical bearings thereon a rockable bar, a handle member carried by said rockable bar, the outer ends of said rockable bar being provided with axle engaging arms and cams adapted to engage the wheeled base, whereby as the handle is forced downwardly to rock the rockable bar said cams will move the rockable bar upwardly in the vertical bearings thereby raising the axle.

2. A vehicle jack comprising a wheeled base, a horizontal bar rockably mounted in elongated vertical bearings, said rockable bar having at its ends upstanding axle engaging members, a handle member carried by the rockable bar and camming means whereby when the handle is moved downwardly to rock the bar said bar will be moved vertically in its bearings.

3. A vehicle jack comprising a wheeled base, a rockable bar rockable in vertical elongated bearings, adjustable axle engaging arms carried by said rockable bar, cams whereby said rockable bar will be moved upwardly in its bearings as the vehicle axle is being raised and a handle member carried by said rockable bar for rocking the same.

4. A vehicle jack comprising a wheeled base, a horizontal bar rockably mounted in elongated vertical bearings, said rockable bar having at its ends upstanding adjustable axle engaging members, a handle member carried by the rockable bar and cams carried by said rockable bar and located beneath the same in engagement with the wheeled base whereby as the handle is forced downwardly said axle engaging member will be moved toward the vertical position and the rockable bar moved vertically in its bearings.

5. A vehicle jack comprising a wheeled base, a horizontal bar rockably mounted in elongated vertical bearings carried by said wheeled base, said rockable bar having at its ends upstanding axle engaging members, a handle member carried by the rockable bar, and cams carried by said rockable bar and disposed below the same whereby as the handle is forced downwardly said axle engaging member will be moved to a vertical position and the rockable bar moved in its vertical bearings.

6. A vehicle jack comprising a wheeled base, a horizontal bar rockably mounted in elongated vertical bearings carried by said wheeled base, said rockable bar having at its ends upstanding axle engaging members, a handle member carried by the rockable bar, and cams carried by said rockable bar and engaging the wheeled base whereby as the handle is forced downwardly the rockable bar will be rocked and the arms engaging the axles moved toward a vertical position and slightly past the same at the same time that the wheeled base is moved farther under the axle.

7. A vehicle jack comprising a wheeled base, a horizontal bar rockably mounted in elongated vertical bearings, said rockable bar having at its ends upstanding axle engaging members, a handle member carried by the rockable bar, camming means whereby when the handle is moved downwardly to rock the bar, said bar will move vertically in its bearings, and means whereby the handle member may be locked in its downward position.

In testimony whereof I hereunto affix my signature.

DANIEL BRUHN.